UNITED STATES PATENT OFFICE.

BRAXTON D. AVIS, OF CLARKSBURG, WEST VIRGINIA.

COLORATION METHOD.

1,277,172.   Specification of Letters Patent.   Patented Aug. 27, 1918.

No Drawing.   Application filed January 8, 1918.   Serial No. 210,877.

*To all whom it may concern:*

Be it known that I, BRAXTON D. AVIS, a citizen of the United States, and a resident of Clarksburg, in the county of Harrison and State of West Virginia, have invented a new and Improved Coloration Method, of which the following is a full, clear, and exact description.

My invention relates to a coloration method in which a double mercuric salt is precipitated on a surface and renders the said surface iridescent. This method forms an improvement over the method disclosed in my Patent No. 933,522 issued September 7, 1909. This method is characterized from my previous method by the elimination of the necessity of a subsequent treatment with ammonia of the surface to be colored.

I have discovered that if a solution containing a salt of mercury, especially a mercuric salt, is added to a solution of ammonium hydroxid there is formed a precipitate containing a double salt of mercury and ammonium which is insoluble in water.

I have further discovered that this precipitate is soluble in a strong solution of ammonium hydroxid containing a salt of ammonium. If such an alkaline solution is poured on a surface, plain or curved, there will be an immediate evaporation of the ammonia, due to the large surface and the facilities offered to the ammonia to evaporate. In consequence, a precipitate of the double mercury salt is produced on the surface in the form of a fine coating. This coating in drying has a tendency to adhere to the surface and make the surface beautifully colored, thereby rendering objects coated in the manner as pointed out suitable for ornamentation.

Although any soluble mercuric salt can be used for the purpose, I prefer to utilize a mercuric nitrate. To an acid solution of mercuric nitrate, ammonium hydroxid is added until all of the mercuric nitrate is precipitated as dimercuric-ammonium nitrate. This precipitate is filtrated, or allowed to settle, and the liquid decanted. The filtrate or sediment is added to a strong solution of ammonium hydroxid containing an ammonium salt, such as a carbonate chlorid, or preferably nitrate. The quantity used is just enough to dissolve the precipitate. The solution will necessarily be alkaline, and is ready for coating surfaces to be rendered colored.

When applying this solution to vitrified substances such as glass, porcelain, etc., it is necessary to have the surface perfectly clean. It may be remarked that when a glass surface is coated in a manner as described the transparency of same is not interfered with. When the coating is to be applied to metallic surfaces it is preferable to have the surface to be coated polished. When a coating is to be applied to a porous surface, such as paper or wood, it is preferable to first form a film of sodium silicate on the surface and then precipitate upon the surface the double mercuric salt.

It is self-evident that in place of filtering or precipitating the double salt of mercury and ammonium and then redissolving it in a concentrated solution of ammonium hydroxid and ammonium nitrate, the solution containing the precipitate of the double salt can be treated directly with a concentrated solution of ammonium hydroxid containing a salt of ammonium. But in such cases the quantity of ammonium solution to be added will be larger and, therefore, not as economical, but the resultant would be substantially the same, except that the precipitation would be slower, due to the presence of water formed by the reaction in precipitating the double salt of mercury and ammonium. It is of advantage to add alcohol to the alkaline solution containing the double salt of mercury and ammonium with which the surface is to be coated to obtain the desired precipitate of the double salt of mercury and an alkali. The denatured alcohol can be used, and the quantity is about one-quarter by volume of the amount of the solution used for coating. The presence of alcohol stimulates the evaporation and, therefore, quickens the precipitation on the surface of the double salt and seems to increase the refracting power of the precipitated particles.

I claim:

1. A coloration method, which consists in forming an ammoniacal solution of a double salt of mercury and ammonium and coating the surface to be colored with the solution, whereby the double salt of mercury and ammonium is precipitated on the surface by the evaporation of the ammonia from the solution.

2. A coloration method, which consists in forming an ammoniacal solution of a double salt of mercury and ammonium, adding alcohol thereto, then coating the surface to be colored with the solution by precipitating the double salt of mercury and ammonium resulting from the evaporation of the alcohol and ammonia from the solution.

3. A coloration method, which consists in forming an ammoniacal solution of a double nitrate of mercury and ammonium, then coating the surface to be colored with the solution to precipitate a double nitrate of ammonium and mercury by the evaporation of ammonia from the solution.

4. A coloration method, which consists in forming an ammoniacal solution of a dimercuric ammonium nitrate, adding alcohol to the solution, then coating the surface to be colored with the solution to precipitate the dimercuric ammonium nitrate caused by the evaporation of the ammonia and alcohol in the solution.

5. A coloration method, which consists in forming a precipitate of a dimercuric ammonium nitrate, dissolving the precipitate in a concentrated solution of ammonium hydroxid containing an ammonium salt, then coating the surface to be colored with the solution formed to precipitate the dimercuric ammonium nitrate by means of evaporation of the ammonia from the solution.

6. A coloration method, which consists in forming a precipitate of a dimercuric ammonium nitrate, dissolving the precipitate in a concentrated solution of ammonium hydroxid containing ammonium nitrate, adding alcohol to the solution, coating the surface to be colored with the solution, and precipitating the dimercuric ammonium nitrate by the evaporation of the ammonia and alcohol present in the solution.

7. A coloration method, which consists in forming an alkaline solution of a double salt of mercury and an alkali, adding alcohol to the solution, then coating the surface to be colored with the solution to precipitate the double salt of mercury and alkali produced by the evaporation of the alcohol.

BRAXTON D. AVIS.